United States Patent
Pardoe et al.

(10) Patent No.: US 10,346,199 B2
(45) Date of Patent: Jul. 9, 2019

(54) HANDLING EXCEPTIONS RELATED TO CORRUPT APPLICATION STATE

(75) Inventors: Andrew J. Pardoe, Bellevue, WA (US); Michael M. Magruder, Carnation, WA (US); Kumar Gaurav Khanna, Redmond, WA (US); Diana Milirud, Bellevue, WA (US); Gaye Oncul Kok, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1138 days.

(21) Appl. No.: 12/421,649

(22) Filed: Apr. 10, 2009

(65) Prior Publication Data

US 2010/0262814 A1     Oct. 14, 2010

(51) Int. Cl.
*G06F 9/38*     (2018.01)
*G06F 9/48*     (2006.01)

(52) U.S. Cl.
CPC ......... *G06F 9/4812* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 5,784,613 A | 7/1998 | Tamirisa | |
| 6,339,832 B1 | 1/2002 | Bowman-Amuah | |
| 6,775,779 B1 * | 8/2004 | England et al. | 726/26 |
| 6,934,832 B1 | 8/2005 | Van Dyke et al. | |
| 7,207,047 B2 | 4/2007 | Subramanian et al. | |
| 7,240,343 B2 | 7/2007 | Ogasawara | |
| 7,522,516 B1 * | 4/2009 | Parker | H04L 12/56 370/216 |
| 7,647,589 B1 * | 1/2010 | Dobrovolskiy | G06F 11/3644 710/260 |
| 2002/0046230 A1 | 4/2002 | Dieterich et al. | |
| 2006/0005084 A1 * | 1/2006 | Neiger et al. | 714/47 |

(Continued)

OTHER PUBLICATIONS

Suh et al. (Secure Program Execution via Dynamic Information Flow Tracking, Oct. 2004, pp. 85-96).*

(Continued)

*Primary Examiner* — George Giroux
(74) *Attorney, Agent, or Firm* — Fiala & Weaver P.L.L.C.

(57) ABSTRACT

An exception handling system is described herein that provides one or more distinguished classes of software exceptions that are handled differently than other exceptions. The system treats a distinguished exception as a "hard to catch" exception that is not passed to the catch block of program code unless a developer performs extra steps to acknowledge the distinguished nature of the exception and confirm that the program code is prepared to properly handle the exception. Exceptions that fall into this class are typically those that represent conditions from which normal exception handling practices cannot successfully recover, namely exceptions that corrupt application state. Accordingly, the system prevents the developer from catching these classes of exceptions by default unless the developer explicitly requests to have these exceptions delivered to the program code. Thus, the exception handling system encourages correct programming practices by preventing developer error by default.

20 Claims, 3 Drawing Sheets

(56) References Cited

U.S. PATENT DOCUMENTS

| | | | |
|---|---|---|---|
| 2006/0070027 A1* | 3/2006 | Schmelter | G06F 11/3471 717/114 |
| 2006/0101411 A1* | 5/2006 | Selitrennikoff et al. | 717/127 |
| 2006/0101420 A1* | 5/2006 | Shinnar et al. | 717/130 |
| 2006/0253691 A1 | 11/2006 | Barraclough et al. | |
| 2006/0277552 A1* | 12/2006 | Nall | G06F 9/4812 718/108 |
| 2006/0282828 A1* | 12/2006 | Mehta | G06F 9/4812 717/130 |
| 2007/0050848 A1* | 3/2007 | Khalid | G06F 21/52 726/24 |
| 2007/0226795 A1* | 9/2007 | Conti et al. | 726/22 |
| 2008/0270990 A1* | 10/2008 | Kornstaedt | G06F 9/4425 717/126 |

OTHER PUBLICATIONS

Vo et al. (Xept: A Software Instrumentation Method for Exception Handling, Nov. 1997, pp. 60-69).*

Fruja et al. (Modeling the .NET CLR Exception Handling Mechanism for a Mathematical Analysis, Apr. 2006, pp. 5-34).*

Pardoe, Andrew., "CLR Inside Out Handling Corrupted State Exceptions", retrieved at <<http://msdn.microsoft.com/en-us/magazine/dd419661.aspx>>, Feb. 12, 2009, pp. 7.

* cited by examiner

HANDLING EXCEPTIONS RELATED TO CORRUPT APPLICATION STATE

BACKGROUND

Computer programs typically contain two types of code: instructions that carry out the purpose of the program and error handling code that contains instructions for recovering from or responding to unexpected or unusual conditions that occur. Error handling may include addressing anything from a file open failing because the file is not at a requested location to accessing memory that does not belong to the program (e.g., memory that the program did not allocate or has already freed). Software exceptions are one type of error condition notification paradigm. Using exceptions, a program typically surrounds a block of instructions with a "try" block and when an abnormal condition occurs, the program leaves the try block and executes one or more conditionally executed blocks.

An exception is the signal raised when a condition is detected that was not expected in the normal execution of a program thread. Many agents can detect incorrect conditions and raise exceptions. For applications running in a managed environment, exceptions can be raised by program code (or library code the program uses), the runtime engine, and unmanaged code that the application invokes. Exceptions raised on a thread of execution follow the thread through native and managed code and across application domains (e.g., Microsoft.NET AppDomains). If the program does not handle an exception, the exception is typically presented to the operating system and treated as an unhandled exception. While every managed exception has a type (e.g., System.ArgumentException or System.ArithmeticException), the type may only be meaningful in the context in which the exception is raised. A program can handle an exception if it understands the conditions that caused the exception to occur. However, if the program does not handle the exception, it could indicate any number of bad things to code remote from the point of failure that ultimately receives the exception. Once the exception has left the program, it only has one very general meaning: something bad has happened.

Exceptions represent a wide range of unexpected conditions during execution of a program. Exceptions may occur at a variety of levels when a program is viewed as a logical stack of layers. For example, the operating system may provide exceptions (e.g., structured exception handling (SEH)), an underlying runtime may provide exceptions (e.g., the C-language runtime or Microsoft.NET Common Language Runtime (CLR)), and the program itself may provide exceptions defined by the language used to create the program (e.g., C-language exceptions, Microsoft.NET exceptions, and so forth). For higher-level languages, the environment may wrap each of these exceptions into one or more types recognized by the language of the program. For example, Microsoft.NET represents any native exception as a specific managed exception that inherits from the Microsoft.NET Exception class.

Although providing multiple types of exceptions in a form familiar to developers increases the chance that a developer will be able to write code to handle an exception, this can also lead to a false sense that the developer has the ability to handle a particular exception correctly. Exception hierarchies encourage developers to catch overly broad classes of exceptions and lead to developers catching exceptions that represent error conditions that they cannot or often do not properly handle. For example, a developer may write a catch statement of the form "catch( . . . )" to catch all exceptions in C++ code or "catch(Exception e)" to catch all exceptions inheriting from the class "Exception" in Microsoft.NET languages. These types of constructs are perfectly valid in several programming languages and the result is that it is up to the code associated with the catch statement to correctly handle any type of exception that enters the catch block.

Some languages try to prevent developers from catching a broad class of exceptions. For example, C++ has exception specifications, a mechanism that allows a developer to specify which exceptions a particular function can raise. Java takes this a step further with checked exceptions, a compiler-enforced requirement that a certain class of exceptions be specified. In both languages, the developer lists the exceptions that can flow out of a function in the function declaration and callers are expected to handle those (and only those) exceptions. Exception specifications have had mixed results in practice.

For exceptions that corrupt application state (including corrupting applications, processes, and or runtimes), correct handling is difficult and often not performed correctly leading to unpredictable results. For example, a particular exception may indicate an access violation (AV), illegal instruction, use of freed memory, corruption of program data, and so forth. Continuing to execute at all in such an environment is risky, and those programs that do handle such exceptions correctly typically do so by performing a minimal amount of cleanup (taking care not to access potentially corrupt data structures) and exiting.

SUMMARY

An exception handling system is described herein that provides one or more distinguished classes of software exceptions that are handled differently than other exceptions. In some embodiments, the system treats a distinguished exception as a "hard to catch" exception that is not passed to the catch block of program code unless a developer performs extra steps to acknowledge the distinguished nature of the exception and confirm that the program code is prepared to properly handle the exception. Exceptions that fall into this class are typically those that represent conditions from which normal exception handling practices cannot successfully recover, namely exceptions that corrupt application state. Accordingly, the system prevents the developer from catching these classes of exceptions by default unless the developer explicitly requests to have these exceptions delivered to the program code. Thus, the exception handling system encourages correct programming practices by preventing developer error by default. In addition, because the system causes the developer to explicitly identify handling code for corrupting exceptions within the software code, static code checking and other tools can provide warnings about improper catching or handling of corrupted state exceptions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An exception handling system is described herein that provides one or more distinguished classes of software exceptions that are handled differently than other exceptions. The distinguished class of exceptions may be part of the same class hierarchy in an object-oriented language as other exceptions, or may be in a separate hierarchy. When in the same hierarchy, the system identifies the distinguished exceptions by setting an identified attribute or data member on each distinguished exception. In some cases, an exception of a particular type may be part of the distinguished class in some instances and not others. For example, the system may treat an access violation occurring in application code differently from an access violation occurring in operating system code, while both may share the same exception type (e.g., System.AccessViolation in Microsoft.NET languages). Accordingly, the context of the exception may be more relevant than the exception's type.

In some embodiments, the system treats a distinguished exception as a "hard to catch" exception that is not passed to the catch block of program code unless a developer performs extra steps to acknowledge the distinguished nature of the exception and confirm that the program code is prepared to properly handle the exception. For example, using Microsoft.NET, the system may only pass distinguished exceptions to functions marked with a particular attribute (e.g., HandleProcessCorruptedStateExceptions). Exceptions that fall into this class are typically those that represent conditions from which normal exception handling practices cannot successfully recover, namely exceptions that corrupt application state. Accordingly, the system prevents the developer from catching these classes of exceptions by default unless the developer explicitly requests to have these exceptions delivered to the program code.

Thus, the exception handling system encourages correct programming practices by preventing developer error by default. At the same time, the system provides developers with the same level of functionality so that those with a legitimate reason for catching and handling a corrupted state exception can still do so. In addition, because the system causes the developer to explicitly identify handling code for corrupting exceptions within the software code, static code checking and other tools can provide warnings about improper catching or handling of corrupted state exceptions.

Figure 1:
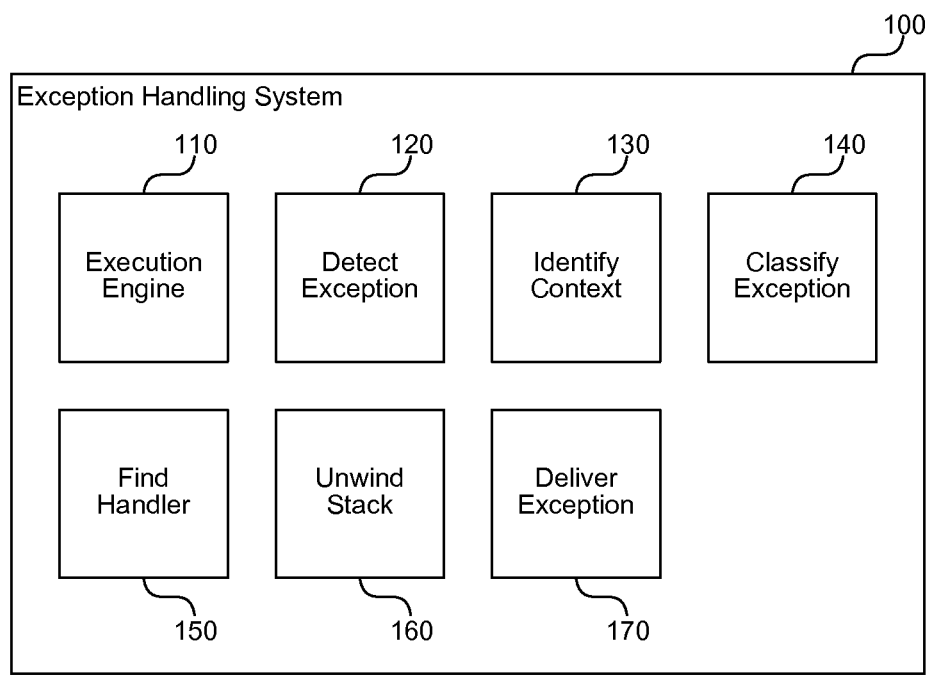
FIG. 1 is a block diagram that illustrates components of the exception handling system, in one embodiment.

FIG. 1 is a block diagram that illustrates components of the exception handling system, in one embodiment. The system 100 includes an execution engine 110, a detect exception component 120, an identify context component 130, a classify exception component 140, a find handler component 150, an unwind stack component 160, and a deliver exception component 170. Each of these components is described in further detail herein.

The execution engine 110 provides the context in which applications execute. Depending on the programming language and higher-level constructs provided by the programming language, the execution engine 110 may be as simple as the operating system's execution of a stream of processor instructions or as complex as a virtual machine environment that decodes and executes instructions in a sandbox. Common to each of these types of execution, however, is a mechanism for detecting exceptional software conditions and throwing an exception when an exceptional condition occurs. In some cases, the operating system may optimistically allow instructions to execute and the processor itself may provide an interrupt or trap when an exceptional condition occurs that the operating system receives and directs back to the faulting program.

The detect exception component 120 receives notification when an exception occurs. For example, the detect exception component 120 may include a handler for receiving structured exceptions through SEH, a runtime exception handler for catching exceptions within a runtime, an unmanaged function that receives an error code from code that does not use exceptions and then throws an exception based on the error code, and so forth. Thus, rather than a single consolidated component the detect exception component 120 may include several functions at various layers to detect different classes of exceptions on behalf of a particular program.

The identify context component 130 identifies circumstances surrounding an occurrence of a detected exception that extend beyond the type of the exception. For example, the identify context component 130 may determine whether a particular type of exception occurred within the program code, within operating system code, or within runtime code. Based on the context surrounding the occurrence of the exception, the system 100 may classify the exception as a corrupted state exception.

The classify exception component 140 receives information from the detect exception component 120 about the type of exception and from the identify context component 130 about the context surrounding the occurrence of the exception, and classifies whether the exception reflects corrupt application state (e.g., a corrupted state exception) or not. If the classify exception component 140 classifies the exception as a corrupted state exception, then the component 140 marks the exception object instance as being a corrupted state exception so that the find handler component 150 and other components can distinguish the exception from other exceptions. Those of ordinary skill in the art will recognize that there are numerous ways of specifying a particular quality of an object, such as specifying that a particular exception is a corrupted state exception. For example, rather than marking the exception object itself, the system can maintain a separate table or other data structure that identifies corrupted state exceptions.

The find handler component 150 searches for a handler to handle a detected exception and returns any identified handler. Traditional exception handling looks first in the function where an exception occurred for a handler and if none is found then walks up the call stack to identify a parent function containing a handler. If no handler is found, the exception is ultimately passed to the operating system, which typically terminates the program with an unhandled exception error. Because the exception handling system 100 seeks to make corrupted state exceptions harder to catch than normal exceptions to encourage more sophisticated handling of such exceptions, the find handler component 150 carries out a process similar to the traditional process but skips any functions that are not marked with a distinguishing attribute that verifies that the function's author wrote the function considering the particular handling inherent with corrupted state exceptions. The find handler component 150 may also include other considerations, such as a trust level of the program module, a security designation of the module, whether the module is hosted by a host application, a version associated with the program code, and so forth.

The unwind stack component 160 determines whether to execute stack unwind semantics before handing processing to the identified handler. Traditional exception handling executes any finally, fault, and other types of unwind code found between the point of the exception and the identified handler in the execution stack. Because corrupted state exceptions involve conditions that can make executing such unwind code dangerous to program data and/or stability, the exception handling system 100 may not execute unwind code that is not within a function marked with the distinguishing attribute described herein.

The deliver exception component 170 delivers the exception to the identified handler, if the find handler component 150 found one. The deliver exception component 170 calls the catch block or other handling code of a function marked with the distinguishing attribute so that the handling code can process the exception. In some cases, the handling code may throw additional exceptions, and the deliver exception component 170 may invoke the classify exception component 140 to mark those exceptions as corrupted state exceptions as well (described further herein).

The computing device on which the exception handling system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
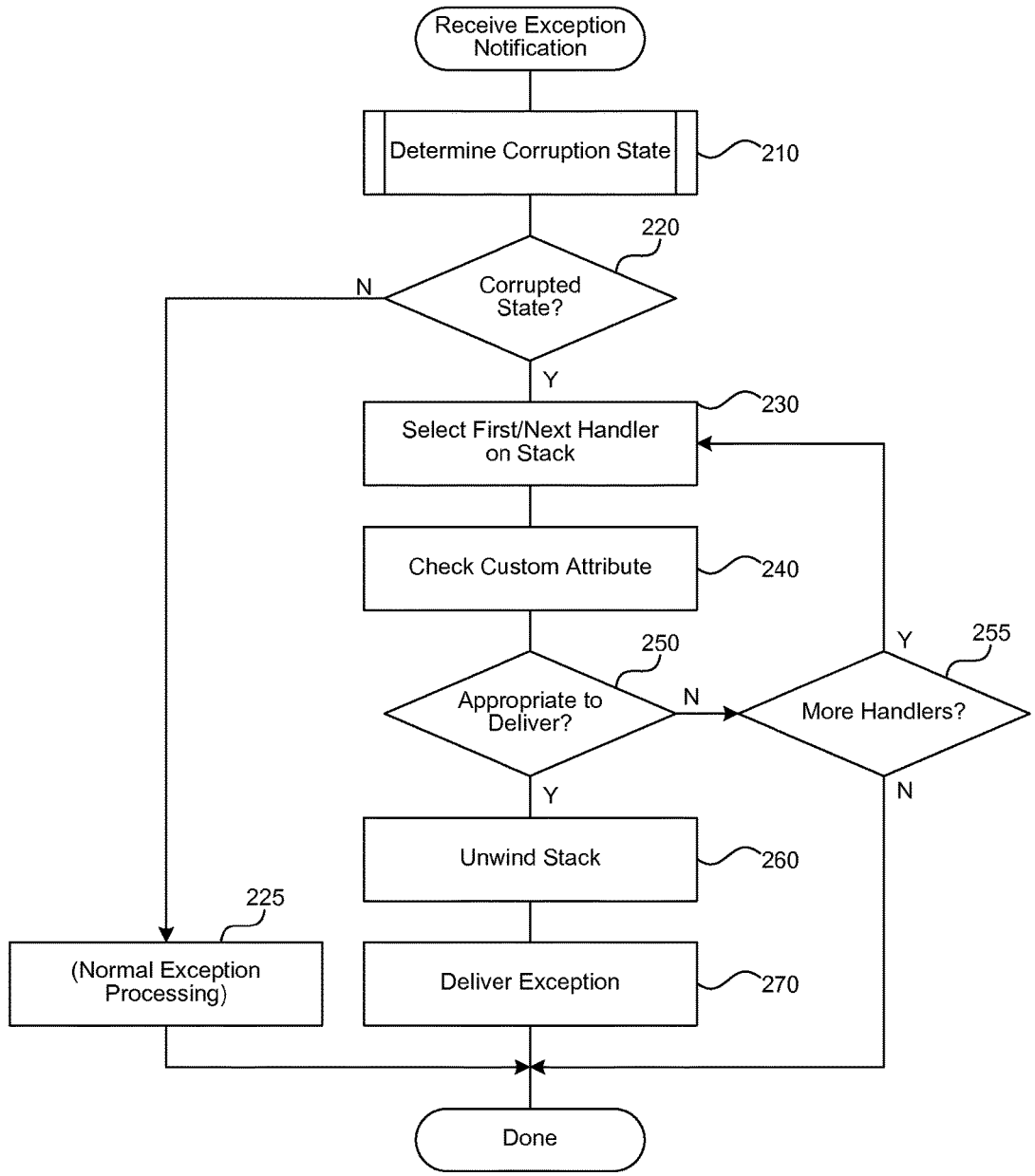
FIG. 2 is a flow diagram that illustrates the processing of the system when an exception occurs, in one embodiment.

FIG. 2 is a flow diagram that illustrates the processing of the system when an exception occurs, in one embodiment. Beginning in block 210, the system heuristically determines the scope of an exception's effect based upon the context in which the exception is raised. If the exception represents potentially corrupted application state, the system will not deliver the exception to executing code unless the code has explicitly requested to receive such exceptions. The developer can use a custom attribute in code to request that the system deliver all exceptions to the developer's code during execution. Continuing in decision block 220, if the exception is a corrupted state exception, then the system continues at block 230, else the system jumps to block 225 and processes the exception using traditional exception processing.

Continuing in block 230, the system selects the first exception handler in the stack closest to where the exception occurred. For example, if the function where the exception occurred contains a catch statement, then the system selects the catch statement. In a traditional two-pass exception handling system, this represents the first pass during which an appropriate handler is located. Continuing in block 240, the system checks the custom attribute to determine whether the selected handler can handle corrupted state exceptions. For example, the function that contains the handler may contain an attribute that the system can inspect using reflection or other techniques well known in the art.

Continuing in decision block 250, if the custom attribute is set, then the system identifies the selected handler as the handler that will handle the exception and continues at block 260, else the system continues at block 255. In decision block 255, if there are more handlers, then the system loops to block 230 to select the next available exception handler from the stack, else the system completes. When an exception is raised the system delivers the exception to every catch and filter clause on the stack. These clauses determine if they want to handle the exception. If the exception is a corrupted state exception, the system will not deliver the exception to any catch/filter clauses unless its containing function is marked with a custom attribute indicating the developers desire to have the exception delivered. If no handler is found, then the system provides the exception to the operating system to determine how to handle the exception.

For backwards compatibility, the system may also check an application or runtime version (not shown) to determine whether to deliver the corrupted state exception to the application. For older applications built before the system described herein, the system may continue to deliver all exceptions to the application, even those that indicate corrupted state. In some embodiments, the system may only deliver corrupted state exceptions to full trust application code (not shown), or containing other designations such as "security critical" that indicate a high level of access of the application.

Continuing in block 260, the system unwinds the stack by identifying stack unwind blocks and calling them if they are within a function marked with the custom attribute. Like steps 230 to 255, this process may loop through one or more potential unwind blocks to determine if any request to unwind state for corrupted state exceptions. During a typical stack unwind all finally and fault blocks are invoked. If the exception is a corrupted state exception the system will not invoke finally and fault blocks during unwind unless they are in a marked function. In a traditional two-pass exception handling system, this step represents the second pass during which variables and other stack frame elements are unwound.

Continuing in block 270, the system delivers the exception to the identified handler for handling. The handler may perform clean up steps, terminate the process, or perform other actions to isolate and/or recover from the exception. In some cases, the handler may raise additional exceptions. The system may mark such exceptions as also being corrupted state exceptions because they are raised in the context of an exception that indicates potentially corrupted state. The developer uses an explicit custom attribute to mark functions that can process corrupted state exceptions. One positive side effect of the explicit notation is that it can easily be detected by automated code review and static analysis tools for closer inspection. After block 270, these steps conclude.

Although FIG. 2 illustrates a two-pass exception model, those of ordinary skill in the art will recognize that the exception handling system can also operate with a single-pass or other model for processing exceptions. For example, the system may execute "finally" blocks before identifying an exception handler or in an exception system with multiple passes. These and other modifications can be made without deviating from the character of the system described herein.

Figure 3:
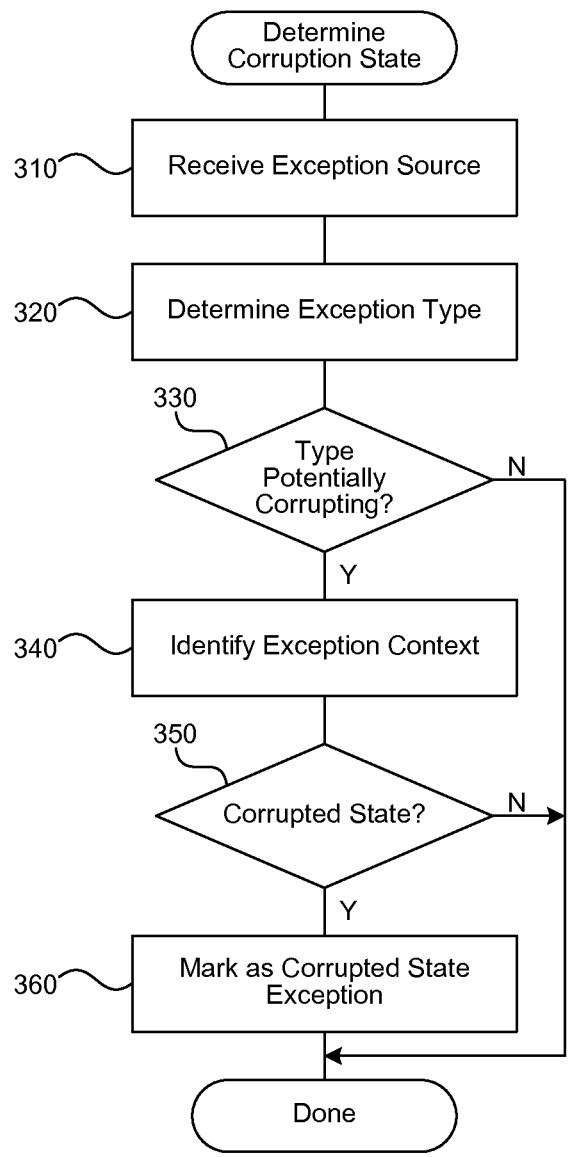
FIG. 3 is a flow diagram that illustrates the processing of the system to identify and mark exception instances as corrupted state exceptions to distinguish them from other exceptions, in one embodiment.

FIG. 3 is a flow diagram that illustrates the processing of the system to identify and mark exception instances as corrupted state exceptions to distinguish them from other exceptions, in one embodiment. Beginning in block 310, the system receives an identification of a source of an exception. For example, the system may receive an operating system notification indicating that an exception occurred along with the operating system's designated type of the exception. As another example, the system may receive a runtime exception of a particular type and/or object class. Continuing in block 320, based on the received source and source type, the system assigns a type to the exception. For example, if the system is implemented within the CLR and the exception is an access violation received from the operating system, then the system may assign a type System.AccessViolation to the exception.

Continuing in block 330, the system determines whether the type indicates that the exception is potentially corrupting. Since an exception is not necessarily a corrupted state exception just because of its type, the system may use additional information to determine whether the exception is a corrupted state exception. However, the determination starts with the exception's type as some exceptions may not indicate corrupted state, others may indicate corrupted state, and others may indicate corrupted state only if certain additional conditions are present. If the exception is potentially corrupting, then the system continues at block 340, else the system completes. Continuing in block 340, the system identifies additional context information associated with the exception. For example, an access violation within program code may indicate a less severe error than an access violation in operating system code. The operating system access violation is more likely to indicate corrupt data or at least a condition from which the program would have difficulty properly recovering.

Continuing in decision block 350, if the exception context indicates that the exception likely indicates corrupted state, then the system continues at block 360, else the system completes. Continuing in block 360, the system marks the exception as a corrupted state exception. For example, the system may set a data member on the exception instance. The data member may not be accessible or visible to program code, but is accessible to system code that determines how to handle the exception. After block 360, these steps conclude.

The following code provides an example of a function that sets the attribute for receiving corrupted state exceptions.

```
// This program runs as part of an automated test system so you need
// to prevent the normal unhandled Exception behavior (Watson dialog).
// Instead, print out any exceptions and exit with an error code.
[HandleProcessCorruptedStateExceptions]
public static int Main( )
{
  try
```

-continued

```
{
  // Catch any exceptions leaking out of the program
  CallMainProgramLoop( );
}
catch (Exception e) // we could be catching anything here
{
  // The exception we caught could have been a program error
  // or something much more serious. Regardless, we know that
  // something is not right. We'll just output the exception
  // and exit with an error. We won't try to do any work when
  // the program or process is in an unknown state!
  System.Console.WriteLine(e.Message);
  return 1;
}
return 0;
}
```

If the exception handling system finds a suitable catch block, the system will unwind the stack as normal but will only execute finally and fault blocks (and in C#, the implicit finally block of a using statement) in functions marked with the HandleProcessCorruptedStateExceptions attribute. The system may ignore the HandleProcessCorruptedStateExceptions attribute when the system encounters the attribute in partially trusted or transparent code because a trusted host would not typically want an untrusted add-in to catch and ignore corrupted state exceptions.

In some embodiments, the exception handling system receives information about program code that can properly handle corrupted state exceptions in ways other than by an attribute marking a function. For example, a developer may mark an entire program module as properly handling corrupted state exceptions. Alternatively or additionally, the system may include modifications to a programming language to include a designation on the catch block or other location that identifies the error handling code as able to handle corrupted state exceptions. Those of ordinary skill in the art will recognize many ways that program code can convey to the system proper handling of corrupted state exceptions, so that the system will pass such exceptions to the program code (or particular functions within the program code) when the exceptions occur.

The system can use various heuristics to determine which exceptions are marked as corrupted state exceptions and which are not. The heuristic designating an exception as having potentially corrupted application state considers the context in which the exception was raised in addition to the type of the exception. For example, using Microsoft.NET, the system may mark an access violation received from the operating system as a corrupted state exception, but not an access violation raised in user code by writing "throw new System.AccessViolation." The context of the error has a bearing on the application's ability to handle it. While the application has little ability to recover from an access violation in operating system code, the application may be able to recover from an access violation in the application's own code.

In addition, the system may determine when a corrupted state exception is delivered to application code in various ways. In some embodiments, when the underlying exception is an operating system provided exception, the application code is running with full trust, and the application code has the distinguished attribute described herein set, the system delivers the exception. For example, under Microsoft Windows, the exception handling system may consider the following operating system exception types as potentially indicating corrupted state: STATUS_ACCESS_VIOLA- TION, STATUS_STACK_OVERFLOW, EXCEPTION_IL-LEGAL_INSTRUCTION, EXCEPTION_IN_PAGE_ER-ROR, EXCEPTION_INVALID_DISPOSITION, EXCEPTION_NONCONTINUABLE_EXCEPTION, EXCEPTION_PRIV_INSTRUCTION, and STATUS_UN-WIND_CONSOLIDATE. System implementers can define other exception types or circumstances as corrupted state exceptions based on the likely condition of the system when the exception of that type or in that circumstance occurs.

By default, the exception is not delivered to executing code. The developer opts-out rather than opting-in, which encourages correct code and allows automated code reviews to flag the code for closer inspection when the code uses the corrupted state exception attribute.

In some embodiments, the exception handling system does not run finally, filter, and fault blocks (or similar constructs of other programming languages) by default during the unwind of the stack despite the fact that these code blocks are typically guaranteed to execute in exceptional circumstances. The finally block exists to specify code that runs whether or not an exception occurs. Similarly, fault blocks are designed to run only when an exception occurs. Developers use these constructs to clean up resources such as file handles or impersonation contexts. Nevertheless, the system does not execute these blocks unless the function in which they are contained is marked with the corrupted state exception-handling attribute. Even code that is written to be reliable using constrained execution regions (CER) will not be executed by the system when a corrupted state exception has been raised unless the code is in a function that has been marked with the HandleProcessCorruptedStateExceptions attribute. The following pseudo code illustrates this process.

```
[HandleProcessCorruptedStateExceptions]
fn1( ) {
    try { }
    catch ( ){ }
}
fn2( ) {
    try { }
    finally { }
}
fn3( ) {
    Access Violation!
}
```

In this example pseudo code, fn1 calls fn2, which calls fn3. An access violation occurs in fn3. Normally, the programming language would define that the exception is handled by the first function in the stack with a catch block (fn1), but before passing the exception to that function, the system would run the code in finally blocks, such as that in fn2, before passing the exception to fn1. The exception handling system, however, may treat corrupted state exceptions differently and not execute such finally blocks unless the function containing the finally block is also marked with the custom attribute (e.g., HandleProcessCorruptedStateExceptions associated with fn1), because finally or fault blocks that are not written with the corrupted state in mind may not perform correctly.

In some embodiments, the system may allow various recovery actions after a failure occurs, particularly when the exception is not handled by the application. The typical action after a corrupted state exception is to terminate the process. In circumstances where the system can isolate the corruption or potential corruption to a smaller entity, the system may only terminate the smaller entity. For example, the system can terminate a thread, application domain, or database transaction associated with the corrupted state exception.

In some embodiments, hosts that invoke application modules can control certain aspects of the system. For example, a host may be able to determine whether an application module sets the attribute described herein for receiving corrupted state exceptions, and may decline to load application modules on this basis. Alternatively or additionally, the host may be able to override application module behavior to cause the system to avoid providing corrupted state exceptions to an application module. For example, a presentation foundation such as Microsoft Silverlight, which often runs modules developed by third parties, may request to close any module when an access violation or other error occurs, regardless of the module's own declared ability to handle such exceptions. The system may also consult an administrator-configurable escalation policy to determine the action or actions to take in response to a corrupted state exception. These and other similar techniques provide hosts and administrators with additional control over hosted application code.

Typically, programming languages that provide exceptions allow exceptions to be caught higher up the stack than the particular function where the exception occurs. In some embodiments, the exception handling system maintains this behavior and passes detected exceptions up the stack until a function is found that is marked with the custom attribute described herein. If no such function is found, then the system treats the exception as unhandled and performs normal cleanup (e.g., process termination) or passes control to the operating system to perform cleanup.

In some embodiments, the exception handling system marks any exceptions thrown by code handling a corrupted state exception as corrupted state exceptions. For example, a corrupted state exception handler may perform some cleanup and re-throw a standard exception type not typically associated with corrupted state exceptions. However, the system may flag the re-thrown exception as potentially having corrupted state so that only functions specifically marked to handle corrupted state exceptions can receive and handle the exception. This is to recognize the unusual nature of corrupted state exceptions and enforce allowing such exceptions to be handled only by application code specifically designed to do so.

In some embodiments, the system marks standard exception types as corrupted state exceptions. For example, if the Microsoft.NET CLR hits an access violation when initializing object types (rather than a particular object instance), then the CLR typically throws a TypeInitializationException type of exception. However, these exceptions may indicate corrupted state, and thus the system may throw the known type and record that the exception represents potentially corrupted state. Identifying the exception as a corrupted state exception prevents exception handlers from handling the exception (even though they may specify handling that exception type) unless they are flagged with the custom attribute for handling corrupted state exceptions and/or other criteria described herein (e.g., running as full trust code).

In some embodiments, the exception handling system allows application developers to turn the system off or cause the system to revert to older behavior, such as to compile older applications using a newer runtime version. The system may provide an entry that the developer can add to the application configuration file (e.g., legacyCorruptedStateExceptionsPolicy=true) to receive the former exception handling behavior. The system may also process exceptions in code compiled using an older runtime version according to the behavior of the older runtime (e.g., without differentiating corrupted state exceptions).

In some embodiments, the exception handling system performs different behavior for managed code that invokes component object model (COM) code (or vice versa) using the Microsoft.NET COM Interop layer. Typically, the COM Interop layer consumes all exceptions, including corrupted state exceptions, if they reach a COM Interop boundary and converts the exceptions to an HRESULT. The HRESULT conversion happens only if a PreserveSig attribute is not applied on the method, but irrespective of whether the attribute is applied or not, the COM Interop layer consumes all exceptions. When a corrupted state exception reaches a COM Interop boundary, the exception handling system described herein will validate whether the method has the HandleProcessCorruptedStateExceptions attribute applied and has valid security properties as described further herein. If the method is marked, then the system converts the exception to an HRESULT that the system returns to the caller. If not, the system allows the exception to continue working its way up the execution stack looking for a handler.

It should be noted that exceptions described herein as being marked by the system as having potentially corrupted application state flow across AppDomain boundaries, managed-native code transitions, COM boundaries, and so forth. Regardless of where an exception originates, it may be handled some distance away based on where the system first encounters a handler appropriately marked to catch the exception.

From the foregoing, it will be appreciated that specific embodiments of the exception handling system have been described herein for purposes of illustration, but that various modifications may be made without deviating from the spirit and scope of the invention. For example, although examples of the system have been described using managed code, the system can be applied equally well to unmanaged (i.e., native) code. Accordingly, the invention is not limited except as by the appended claims.

We claim:

1. A computer-implemented method for handling software and hardware exceptions, the method comprising:
    executing a software application;
    detecting an exception that indicates an error encountered by the software application;
    identifying a particular type of the detected exception and a context of the detected exception based on circumstances surrounding the detected exception;
    determining that the detected exception indicates a corrupt or potentially corrupt application state based on the particular type and based on the context indicating a first context of at least two contexts, a second context of at the least two contexts indicating an application state that is not corrupt;
    identifying a first exception handler of an ordered set of exception handlers on a program call stack within the software application, the identified first exception handler being closest to the detected exception on the program call stack;
    determining that the first exception handler does not have an attribute associated therewith that indicates a corrupted exception handler;
    determining that the identified first exception handler cannot successfully recover from the detected exception based on the determination that the first exception handler does not have the attribute associated therewith;
    identifying a second exception handler of the ordered set within the software application;
    determining that the second exception handler has the attribute associated therewith; and
    invoking the second exception handler and delivering the detected exception that indicates the corrupt or potentially corrupt application state to the second exception handler for recovery from the exception,
    the preceding steps being performed by at least one processor.

2. The method of claim 1 wherein determining that the exception indicates the corrupt or potentially corrupt application state comprises determining the exception occurred within program code, within operating system code, or within runtime code.

3. The method of claim 1 wherein identifying the second exception handler comprises searching for the attribute associated with one or more functions on the program call stack that indicates that the one or more functions contain a corrupted state exception handler.

4. The method of claim 1 wherein identifying the second exception handler comprises delivering the exception to each catch and filter clause on the program call stack that resides within a function marked as handling corrupted state exceptions.

5. The method of claim 1 further comprising identifying one or more unwind blocks to unwind a stack and invoking the one or more identified unwind blocks, wherein identifying one or more unwind blocks comprises identifying unwind blocks contained within one or more functions associated with the attribute that indicates that the functions can handle corrupted state exceptions.

6. The method of claim 1 wherein identifying the second exception handler further comprises checking an application or runtime version to determine whether to deliver the detected exception determined to indicate the corrupt or potentially corrupt application state to the application.

7. The method of claim 1 wherein identifying the second exception handler further comprises checking an application trust level to determine whether a function containing the second exception handler is granted sufficient trust to handle the detected exception determined to indicate the corrupt or potentially corrupt application state.

8. The method of claim 1 wherein invoking the identified second exception handler further comprises invoking finally and fault blocks contained within a function marked with the attribute.

9. The method of claim 1 wherein invoking the identified second exception handler further comprises receiving an indication that the exception handler raised an exception, and marking the raised exception to indicate that the raised exception is a corrupted state exception.

10. A computer system for encouraging correct program code by distinguishing corrupting and non-corrupting program exceptions, the system comprising:
    a processor and memory configured to execute software instructions;
    a detect exception component configured to receive a notification in response to an exception occurring within a software application;
    an identify context component configured to identify circumstances surrounding an occurrence of a detected exception in addition to a particular type of the detected exception;
    a classify exception component configured to:
        receive information from the detect exception component about the particular type of the detected exception and from the identify context component about a context surrounding the occurrence of the exception, classify that the detected exception indicates a corrupt application state based on the particular type and based on the context indicating a first context, and classify that the detected exception does not indicate a corrupt application state based on the particular type and based on the context indicating a second context;

a find handler component configured to:

search an ordered set of exception handlers on a program call stack for a handler to handle the detected exception, determine a first subset of the ordered set, each exception handler of the first subset not having an attribute associated therewith that indicates a corrupted exception handler, and not being able to recover from the detected exception, determine a second subset of the ordered set, each exception handler of the second subset having the attribute associated therewith that indicates a corrupted exception handler, and return at least a portion of the second subset as one or more found handlers; and a deliver exception component configured to deliver the detected exception to a first found handler from the one or more found handlers, the first found handler existing within the software application, the first found handler being configured to recover from the exception.

11. The system of claim 10 wherein the detect exception component detects an exception in response to an operating system raising a structured exception handling (SEH) exception.

12. The system of claim 10 wherein the identify context component is further configured to determine whether the particular type of exception occurred within program code, within operating system code, or within runtime code.

13. The system of claim 10 wherein the classify exception component is further configured to mark the detected exception as a corrupted state exception so that the find handler component can distinguish the detected exception from other exceptions.

14. The system of claim 10 wherein the find handler component is further configured to look first in a function where the detected exception occurred for a handler and if none is found then navigate up a call stack to identify a parent function containing a handler.

15. The system of claim 10 wherein the find handler component is further configured to, if no handler is found, pass the detected exception to an operating system to handle the exception.

16. The system of claim 10 further comprising an unwind stack component configured to determine whether to execute stack unwind semantics before handing processing to the first found handler.

17. The system of claim 10 wherein the deliver exception component is further configured to call a catch block of a function marked with the attribute so that the catch block can process the detected exception.

18. A computer-readable storage medium comprising instructions for controlling a computer system to determine whether an exception indicates a corrupt application state, the instructions, when executed, causing a processor to perform actions comprising:

receiving an identification of a source of an exception within a software application including a particular type of the exception;

receiving an indication of a context in which the exception occurred, the context indicating a first context of at least two contexts that also includes a second context indicating an application state that is not corrupt;

based on the received exception source, the particular type of the exception, and the first context, determining that the exception indicates the corrupt application state; and in response to determining that the exception indicates the corrupt application state, marking the exception as a corrupted state exception by setting a data member accordingly on an instance of the exception so that exception handling code within the software application can provide the exception to one or more exception handlers, that have a common attribute associated therewith that indicates a corrupted exception handler, each of which provides a different handling from a first exception handler to recover from corrupted state exceptions and other exceptions.

19. The computer-readable storage medium of claim 18 wherein receiving the identification of the source of the exception comprises receiving an operating system notification indicating that the exception occurred along with an operating system designated type of the exception.

20. The computer-readable storage medium of claim 18 wherein receiving the indication of the context in which the exception occurred comprises receiving an indication of whether the exception occurred within the code of the application or external to the application.

* * * * *